United States Patent [19]

Lee

[11] Patent Number: 5,332,957
[45] Date of Patent: Jul. 26, 1994

[54] BATTERY MODULE AND CHARGER

[75] Inventor: Steven S. Lee, Northbrook, Ill.

[73] Assignee: Motorola, Inc., Schaumburg, Ill.

[21] Appl. No.: 937,569

[22] Filed: Aug. 31, 1992

[51] Int. Cl.$^5$ .............................................. H02J 1/00
[52] U.S. Cl. ........................................... 320/2; 320/15
[58] Field of Search ................... 320/2, 5, 15, 22, 23, 320/24; 429/7, 99, 100; 455/89, 90

[56] References Cited

U.S. PATENT DOCUMENTS

| | | | |
|---|---|---|---|
| 4,680,527 | 7/1987 | Benenati et al. | 320/2 |
| 4,709,201 | 11/1987 | Schaefer et al. | 320/2 |
| 4,727,306 | 2/1988 | Misak et al. | 320/22 X |
| 5,150,031 | 9/1992 | James et al. | 320/2 |
| 5,164,652 | 11/1992 | Johnson et al. | 320/2 |
| 5,184,059 | 2/1993 | Patino et al. | 320/15 X |

FOREIGN PATENT DOCUMENTS 9211680 7/1990 PCT Int'l Appl. ..................... 320/2

Primary Examiner—Kristine L. Peckman
Attorney, Agent, or Firm—John W. Hayes

[57] ABSTRACT

A battery module (200) includes a preselected one (105) of a plurality of discrete electrodes (102-105) that is either electrically uncoupled, or is coupled in a fashion that is redundant with respect to one of the other electrodes (102-104). A battery module constructed in this fashion is compatible with both a microprocessor controlled rapid charger (400) and a trickle charger (500) constructed from simple discrete circuitry.

6 Claims, 4 Drawing Sheets

-PRIOR ART-

BATTERY MODULE AND CHARGER

FIELD OF THE INVENTION

This invention relates generally to batteries and in particular to rechargeable batteries for portable RF communication equipment, and is more particularly directed toward battery modules readily adaptable to both microprocessor-controlled rapid chargers and trickle chargers constructed using simple discrete circuitry.

BACKGROUND OF THE INVENTION

Portable communication units have become increasingly popular in recent years. Use of portable cellular telephones, for example, has become widespread. This increasing use of portable communication units is largely traceable to improvements in both circuit miniaturization and battery technology.

Circuit miniaturization has led to construction of portable units that are small in size while offering performance that rivals that of mobile units (generally designed for vehicle mounting rather than being carried on the person). Improvements in battery technology have led to improvements in portable unit output power, talk time, and standby time. As is well-known, talk time refers to battery life while both transmitter and receiver portions of a portable unit are in operation, while the term standby time is related to battery life while the receiver portion is active and the transmitter is inactive.

Of course, most users prefer rechargeable batteries so that the portable unit (or its battery pack alone) can simply be placed in a charger for a period of time to restore the batteries to a fully charged state. This is much simpler and more economical than replacing batteries every time battery voltage falls below a useful level.

Battery chargers generally fall into two categories; rapid chargers and trickle chargers. A rapid charger charges a battery at a relatively high current, achieving full charge in a relatively short period of time. A trickle charger, on the other hand, charges battery cells using a very small current, and consequently takes substantially longer to restore a battery to full charge.

Since rapid chargers subject batteries undergoing recharging to relatively high currents, there is some risk of battery cell damage should the operation be conducted improperly. Several techniques are known in the art for conducting recharging operations based upon distinct sets of charging parameters. For example, batteries may be recharged by monitoring cell temperature and controlling charging current with reference to peak temperature or rate of temperature rise. Battery voltage is monitored during different stages of the recharging cycle according to other techniques. Even rate of voltage change can be a useful parameter in some charging methodologies. Of course, the need for different charging techniques is at least partially driven by changes in battery, technology. Although nickel cadmium rechargeable cells are well-known, nickel metal hydride cells are also in use, as well as lithium batteries.

A sophisticated rapid charger should be able to cope with a mixture of battery technologies and charging regimens. Of course, to do this, the rapid charger would require the ability to identify battery type as well as to make appropriate measurements of temperature, voltage, etc. To handle this degree of complexity, a microprocessor is generally included as part of the recharger circuitry.

Trickle chargers, on the other hand, are often inexpensive alternatives to sophisticated rapid chargers. Instead of employing a microprocessor, simple discrete components within the trickle charger generate the appropriate low charging current when a predetermined component within the battery module to be charged completes an electrical connection with the trickle charger circuitry. Present trickle chargers, largely due to their inherent lack of sophistication, are generally compatible with only one or two battery types. Rapid chargers, of course, because of their microprocessor construction, have sufficient flexibility to detect many battery types and provide a suitable charging environment.

In order to avoid the necessity of constructing a myriad different types of trickle chargers to accommodate different battery types, a need arises for a battery module that provides flexible connections of interior components that can be detected easily by either sophisticated rapid chargers or less sophisticated trickle chargers.

SUMMARY OF THE INVENTION

Both this need and others are satisfied by the battery module of the present invention. A battery module is provided that includes a housing having an interior and an exterior, a plurality of battery apparatus materials, including a battery, disposed within the interior of the housing, and a plurality of discrete electrodes electrically accessible from both within the housing interior and the housing exterior. At least a preselected one of the discrete electrodes is electrically connected in one of a group of electrical configurations consisting of: electrically uncoupled with respect to any of the battery apparatus materials; and coupled internally in a manner that is redundant with respect to a preselected other one of the plurality of discrete electrodes.

DESCRIPTION OF A PREFERRED EMBODIMENT

Figure 1:
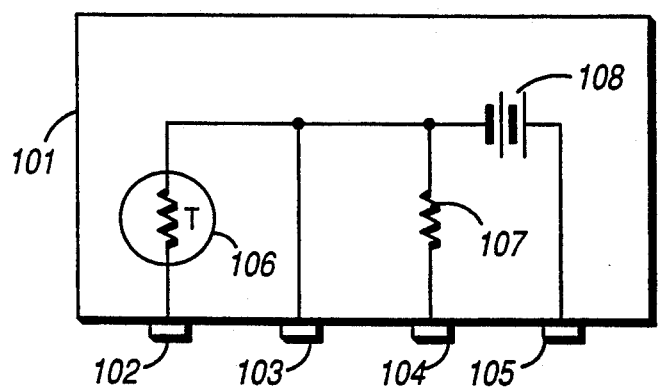
FIG. 1 depicts a battery module of the prior art.

A battery module of the prior art is illustrated in FIG. 1, generally depicted by the numeral 100. The battery module is provided with four relatively closely-spaced contacts (102–105) disposed on an exterior surface of the battery module housing (101). One contact (105) is coupled to an array of rechargeable battery cells (108), generally of nickel cadmium construction, although other materials may also be used. The battery cells (108) are also coupled to a common contact (103).

An internal resistor (107) is shown coupled between a dedicated resistor contact (104) and the common contact (103). The value of this internal resistor (107) is measured by external charging equipment to determine battery type and associated charging rate. In general, a particular manufacturer will assign specific resistor values to specific battery types in order to ensure compatibility between that manufacturer's batteries and its charging equipment.

A thermistor (106) is connected between a dedicated contact (102) and the common contact (103). As is well-known in the art, a thermistor is a resistor whose value varies in a predictable fashion in response to variations in temperature. Since the thermistor (106) is placed in close proximity to the rechargeable battery cells (108), thermistor resistance represents an accurate measure of battery cell temperature.

Cell temperature is an important parameter in the battery charging art. As is well-known, a nickel cadmium battery is commonly charged by supplying a known current to the battery. For rapid charging, a relatively large current is supplied, which causes cell temperature to increase. In one method of charging control, called the temperature cut-off method, when the cells reach a predetermined temperature the charging mode is changed from rapid charge to trickle charge. From a practical standpoint, this means that the relatively large current used for rapid charging is reduced to a relatively small current. For example, a high capacity battery of 1200 milliampere-hour (mAh) capacity would commonly be rapid charged with a current of 1200 milliamperes (mA). When the cells reach their predetermined temperature, the current is reduced to only 80 mA for trickle charging mode.

A more effective charging control protocol is the delta T method. Delta T refers to the fact that the rate of change of temperature is measured to determine optimum charging of a cell, as opposed to measuring a limit temperature as in the temperature cut-off method. Of course, in order to implement the delta T technique, the battery charger requires a greater degree of sophistication.

Figure 2:
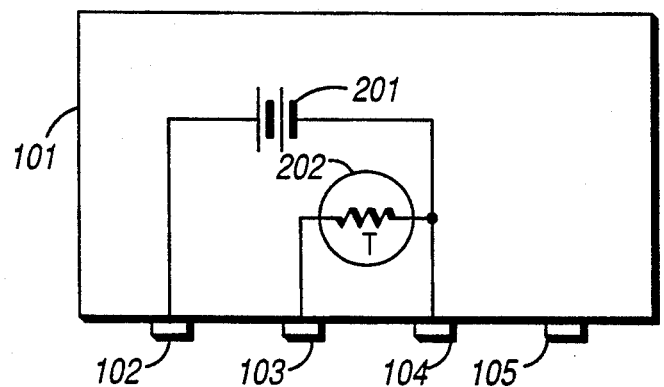
FIG. 2 illustrates one embodiment of a battery module constructed in accordance with the present invention.

A battery module constructed in accordance with the teachings of the present invention is illustrated in FIG. 2, and generally depicted by the numeral 200. The battery module (200) includes a housing (101) having both interior and exterior portions, with a plurality of battery apparatus materials, including a battery (201), disposed within the interior of the housing (101). A plurality of discrete electrodes (102-105) is electrically accessible from both the interior and exterior of the housing (101). A preselected one (105) of the discrete electrodes (102-105) is either left electrically uncoupled, as illustrated in the figure, or is simply coupled internally to one of the other of the plurality of electrodes (102-104). This latter type of internal coupling is not shown in the figure. Specific reasons for this configuration will be discussed in detail below.

Figure 3:
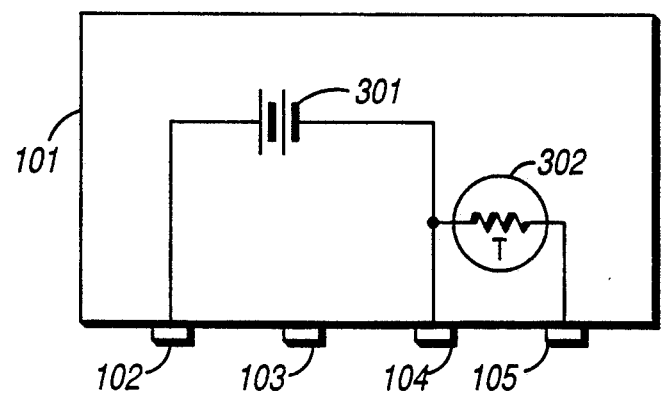
FIG. 3 illustrates another embodiment of a battery module constructed in accordance with the present invention.

FIG. 3 illustrates another embodiment of the invention. A battery module, generally depicted by the numeral 300, includes a housing (101) having an interior and an exterior portion. Disposed within the housing (101) is a plurality of battery apparatus materials, including a battery (301). Again, there exists a plurality of discrete electrodes (102-105) that are electrically accessible from both the interior and the exterior of the battery module housing (101). In the configuration shown in FIG. 3, a different preselected electrode (103) is left electrically uncoupled. In the alternative, the preselected electrode (103) could terminate internally in a configuration that is redundant with respect to the remaining electrodes.

Figure 6:
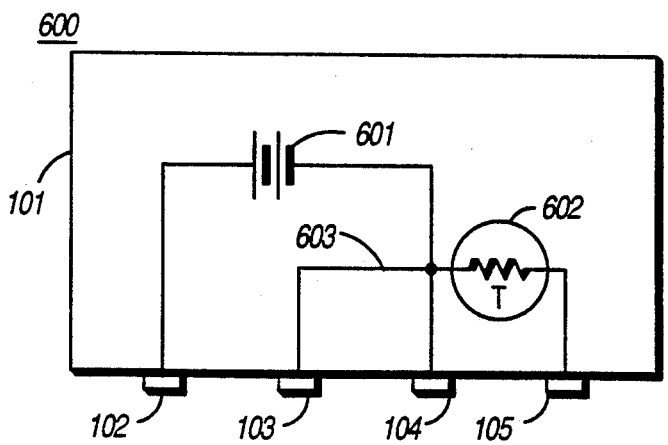
FIG. 6 illustrates yet another embodiment of a battery module constructed in accordance with the present invention.

FIG. 6 illustrates just such a configuration as generally depicted by the numeral 600. An internal connection (603) is made between the preselected electrode (103) and one of the remaining electrodes (104). Thus, the connection of the preselected electrode (103) is redundant with respect to one of the remaining electrodes (104).

Figure 7:
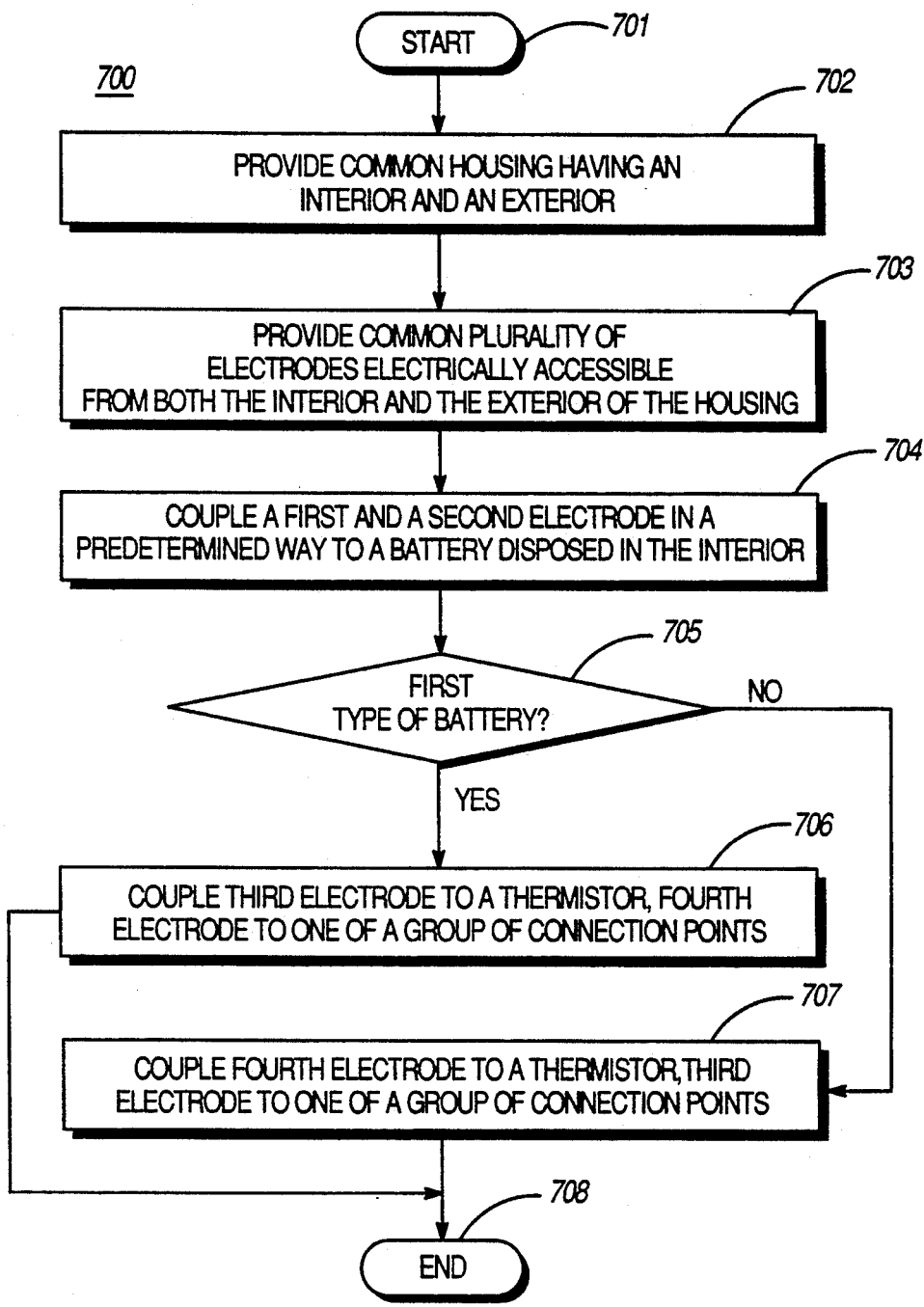
FIG. 7 is a flowchart of method steps that may be followed to fabricate a battery module in accordance with the present invention.

FIG. 7 is a flowchart (generally depicted by the numeral 700) illustrating how a battery module of the present invention may be constructed. First (block 702), regardless of which type of battery is being constructed, a common housing having an interior and an exterior is provided. In the next step (703), a common plurality of electrodes is provided. These electrodes are electrically accessible from both the interior and the exterior of the housing. Regardless of the type of battery being constructed, the first and second electrodes are coupled in a predetermined way to a battery disposed in the interior (block 704).

The type of battery being fabricated must be determined before the completion of construction (block 705). If the battery being constructed is of the first type (block 706), the third electrode is coupled to a thermistor, and the fourth electrode is coupled to one of a group of connection points, the group consisting of: no connection; the positive terminal of the battery; the negative terminal of the battery; one of the leads of the thermistor. In the event that the second type of battery is being constructed (block 707), the fourth electrode is coupled to the thermistor, with the third electrode coupled to one of the group of connection points recited above.

Figure 4:
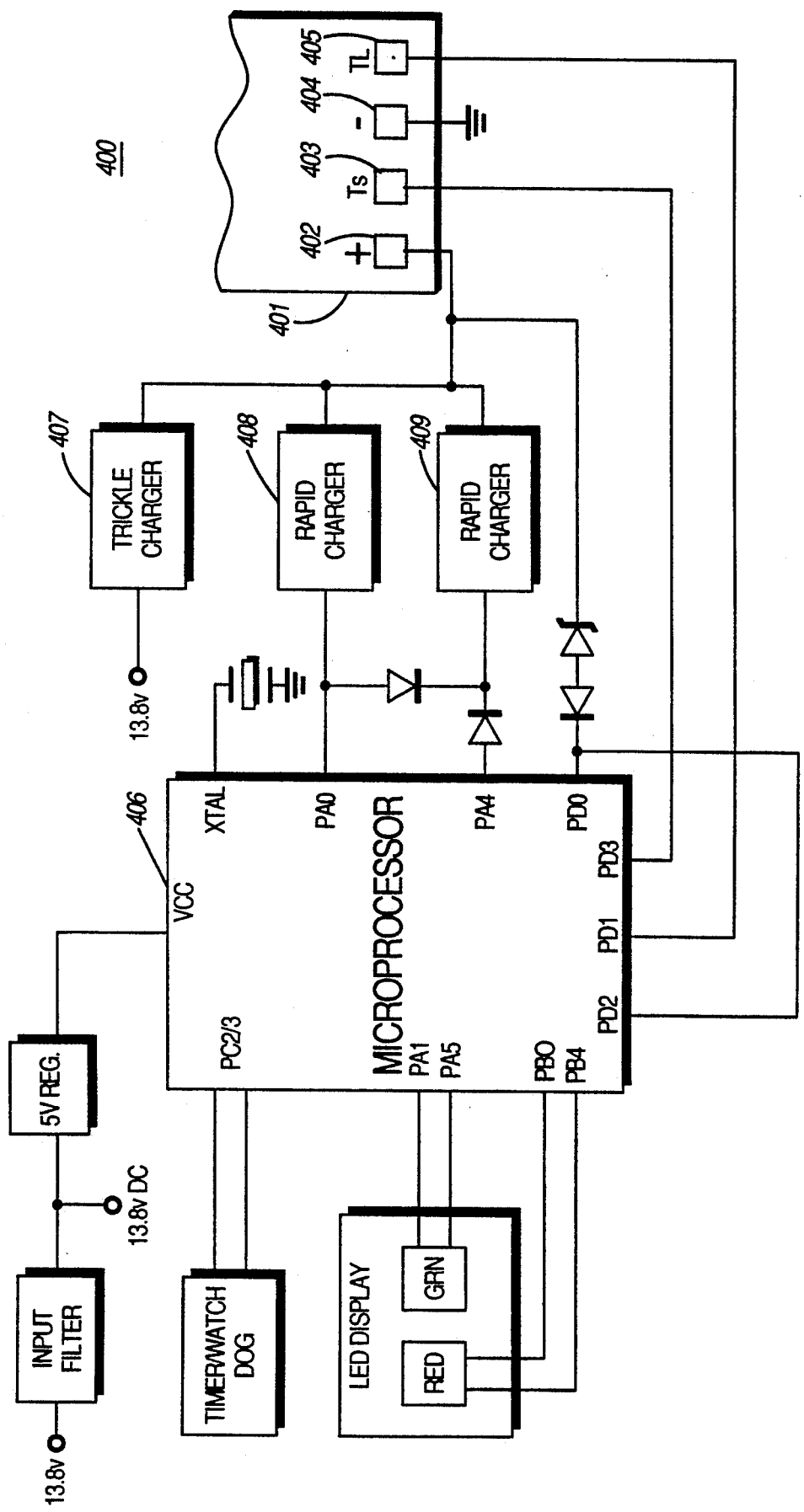
FIG. 4 shows a microprocessor controlled rapid charger in block diagram form.

A microprocessor controlled rapid charger, such as the one illustrated in FIG. 4 (and generally depicted by the numeral 400) can detect the presence of a battery module to be charged by detecting a voltage at terminal 402 of its battery pocket (401). A battery pocket is simply a shaped depression in a battery charger that is designed to hold a battery module during the charging process. The microprocessor (406) in the rapid charger of the preferred embodiment is equipped with an internal analog-to-digital converter (A/D), so that required measurements can be made easily at the terminals (402-405) of the pocket (401) in a manner well understood in the art. When the microprocessor detects a thermistor between contacts 404 and 405 (corresponding to the battery configuration of FIG. 3), all available current sources (407, 408, and 409) are activated, since this corresponds to a high capacity battery configuration. If a thermistor is detected between contacts 403 and 404, this is a low capacity battery configuration, and only two of the current sources (407 and 409) are activated. Of course, since the rapid charger (400) is controlled by a microprocessor (406), variation of thermistor values and positions may also indicate different battery type, such as nickel cadmium, nickel metal hydride, etc., and the microprocessor would then alter charging method and parameters accordingly.

Figure 5:
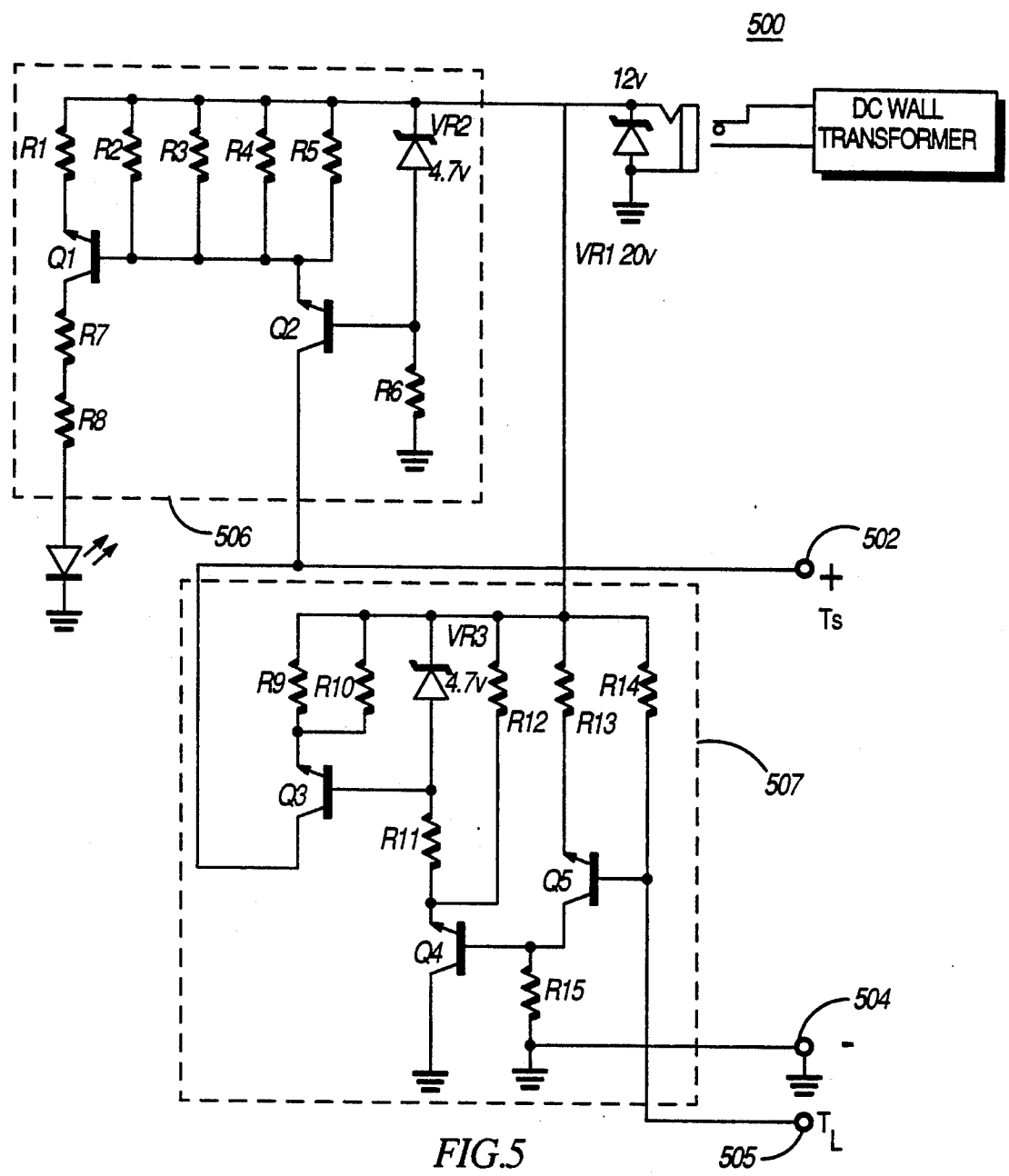
FIG. 5 is a schematic diagram of a trickle charger.

FIG. 5 is a circuit diagram of a trickle charger (generally depicted by the numeral 500) constructed in the manner taught by the present invention. A battery pocket associated with the charger (but not shown in the figure) includes a set of contacts (502, 504 and 505). When a high capacity battery having the general configuration depicted in FIG. 3 is placed in the pocket, the thermistor (302) associated with the battery module (300) forms a connection between contacts 504 and 505, activating a secondary current source (507). Since the primary current source (506) is active anytime a battery is detected in the pocket, the initial trickle charging current will be 120 mA. Since the low capacity battery of FIG. 2 lacks a component between contacts 104 and 105, corresponding charger contacts 504 and 505 will have no component between them, inactivating the secondary current source (507). Thus, the initial trickle charging current will be only 72 mA for the low capacity battery.

What is claimed is:

1. A battery module comprising:
a housing having an interior and an exterior;
a plurality of battery apparatus materials, including a battery, disposed within the interior of the housing;
a plurality of discrete electrodes electrically accessible from within the housing interior, and accessible on the exterior to corresponding electrodes within a charging pocket of a compatible battery charger;
wherein at least a preselected one of the discrete electrodes is electrically uncoupled with respect to the battery apparatus materials.

2. The battery module of claim 1, wherein there are four discrete electrodes.

3. The battery module of claim 2, wherein:
one of the discrete electrodes couples to one terminal of the battery;
another of the discrete electrodes couples to another terminal of the battery; and
another of the discrete electrodes couples to a thermistor.

4. A method for forming a battery module, comprising the steps of:
(a) selecting from among at least a first type and a second type of battery module to construct;
(b) regardless of whether the first type or second type of battery module has been selected, providing a common housing having an interior and an exterior;
(c) regardless of whether the first type or second type of battery module has been selected, providing a common plurality of electrodes that are electrically accessible from the interior of the housing, and accessible on the exterior, to corresponding electrodes within a charging pocket of a compatible battery charger;
(d) regardless of whether the first type or second type of battery module has been selected, coupling a first one and a second one of the plurality of electrodes in a predetermined way to a battery disposed in the interior;
(e) when the first type of battery module has been selected, coupling a third one of the plurality of electrodes to a thermistor, and a fourth one of the plurality of electrodes to one of a group of connection points consisting of:
no connection;
the positive terminal;
the negative terminal;
one of the leads of the thermistor; and
(f) when the second type of battery module has been selected, coupling the fourth one of the plurality of electrodes to the thermistor, and the third one of the plurality of electrodes to one of the group of connection points.

5. A method for charging a battery module having an exterior and an interior, the battery module having a plurality of electrodes that are electrically accessible from the interior of the battery module, and accessible on the exterior to corresponding electrodes within a charging pocket of a compatible battery charger, and wherein the battery module includes a battery having a positive and negative terminal and a thermistor having two leads, and wherein a particular one of the electrodes is coupled to one of a group of connection points consisting of:
no connection;
a redundant connection to the positive terminal;
a redundant connection to the negative terminal;
a redundant connection to one of the leads of the thermistor;
wherein the method comprises the steps of:
(a) detecting presence of the battery module to be charged;
(b) testing at least some of the plurality of electrodes to provide tested electrodes;
(c) when a first one of the tested electrodes comprises the particular one of the electrodes, charging the battery module using a first set of battery charging parameters; and
(d) when a second one of the tested electrodes comprises the particular one of the electrodes, charging the battery module using a second set of battery charging parameters, wherein the first and second sets of battery charging parameters are different from one another.

6. The method in accordance with claim 5, wherein step (b) comprises testing only a predetermined subset of the plurality of electrodes.

* * * * *